(12) United States Patent
Wiepen

(10) Patent No.: US 7,332,246 B2
(45) Date of Patent: Feb. 19, 2008

(54) GALVANIC ELEMENT WITH A SET OF WOUND ELECTRODES

(75) Inventor: Rolf Wiepen, Schwerte (DE)

(73) Assignee: Varta Automotive Systems GmbH, Hannover (DE)

( * ) Notice: Subject to any disclaimer, the term of this patent is extended or adjusted under 35 U.S.C. 154(b) by 232 days.

(21) Appl. No.: 10/236,510

(22) Filed: Sep. 6, 2002

(65) Prior Publication Data

US 2003/0049536 A1 Mar. 13, 2003

(30) Foreign Application Priority Data

Sep. 8, 2001 (DE) .................. 101 44 281

(51) Int. Cl.
*H01M 4/02* (2006.01)
*H01M 2/02* (2006.01)
*H01M 6/00* (2006.01)
*H01M 10/00* (2006.01)
*H01M 4/00* (2006.01)

(52) U.S. Cl. .................. 429/211; 429/178; 429/122; 429/94

(58) Field of Classification Search .................. 429/94, 429/211, 178, 161, 163, 170
See application file for complete search history.

(56) References Cited

U.S. PATENT DOCUMENTS

| | | | |
|---|---|---|---|
| 3,960,603 A | 6/1976 | Morioka et al. | |
| 4,322,484 A | 3/1982 | Sugalski | |
| 4,529,675 A | 7/1985 | Sugalski | |
| 4,554,227 A | 11/1985 | Takagaki et al. | |
| 5,100,746 A | 3/1992 | Muller et al. | |
| 6,013,389 A * | 1/2000 | Nakamaru et al. | 429/161 |
| 6,071,638 A * | 6/2000 | Fradin | 429/94 |
| 6,214,490 B1 | 4/2001 | Pate | |

FOREIGN PATENT DOCUMENTS

| | | |
|---|---|---|
| DE | 30 19 186 A1 | 11/1981 |
| EP | 0 357 399 B1 | 3/1990 |
| EP | 0 413 867 B1 | 2/1991 |
| EP | 1 076 371 A1 | 2/2001 |

OTHER PUBLICATIONS

English Translation from the Federal Republic of Germany, German Patent Office, for DE 30 19 186, 9 pages.

* cited by examiner

*Primary Examiner*—Patrick Joseph Ryan
*Assistant Examiner*—Julian Mercado
(74) *Attorney, Agent, or Firm*—Foley & Lardner LLP

(57) ABSTRACT

A galvanic element including at least one positive electrode in strip form, at least one negative electrode in strip form, at least one separator in strip form interposed between the positive and negative electrodes such that the separator and the electrodes are spirally rolled, and at least one disk-shaped current collector connected mechanically and electrically conductively to an edge portion of at least one of the electrodes, the current collector having more than one contact tab.

15 Claims, 5 Drawing Sheets

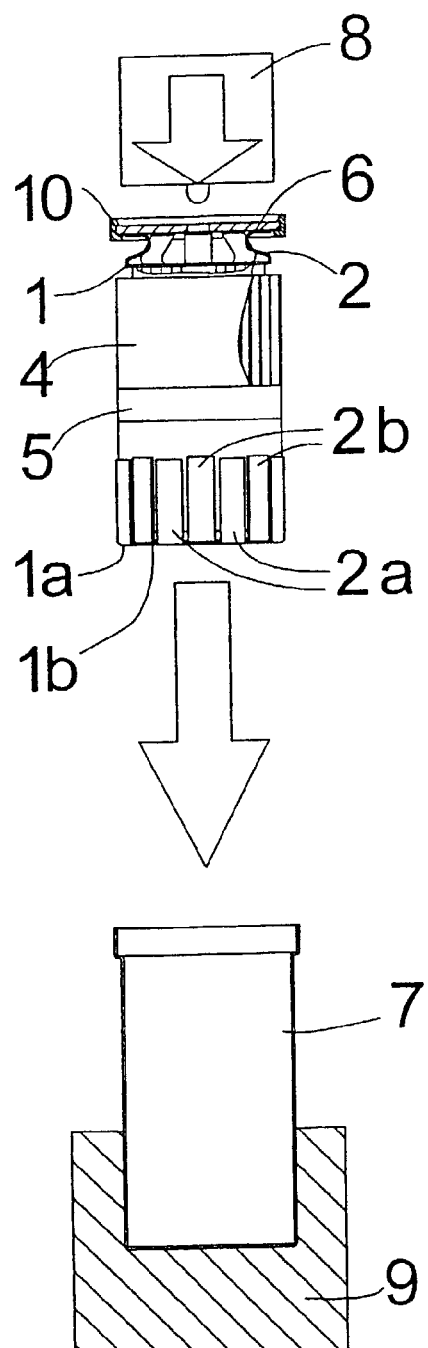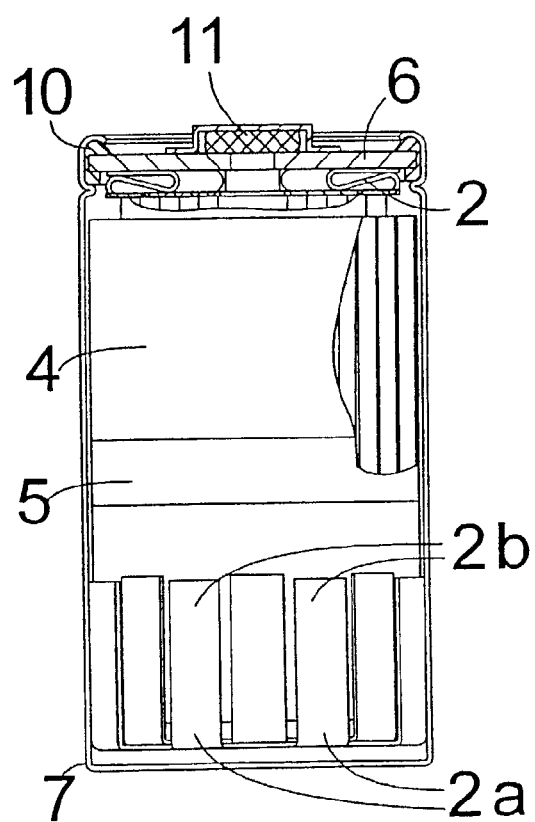
Fig.4
Fig.5 a)

b)

c)

d)

GALVANIC ELEMENT WITH A SET OF WOUND ELECTRODES

RELATED APPLICATION

This application claims priority of German Patent Application No. DE 101 44 281.5, filed Sep. 8, 2001.

FIELD OF THE INVENTION

This invention relates to a galvanic element with a set of wound electrodes. More particularly, this invention relates to lithium, nickel-metal hydride, nickel-cadmium and other galvanic elements in cylindrical cell form with a set of wound electrodes.

BACKGROUND

DE 25 16 530 C3 discloses a current collector in the form of a thin metal plate with a contact tab which has a surface with convex elevations in the form of points, punched formations or a wire mesh.

Another current collector with radially running apertures according to DE 30 19 186 C2 has a contact tab which is beveled and angled away on its longitudinal sides, is bent back toward the current collector and, once it has been firmly connected to the current-dissipating inner side of the cell cover and the cover has been closed, is resiliently supported by the integrally formed webs against the collector plate.

U.S. Pat. No. 4,554,227 attempts to lower the transition resistance by various shaped sheet-metal parts with a contact tab, by forming as many linear contacts as possible.

The configuration of the current collector for wound electrodes with a contact tab as provided by the prior art represents a constriction for the current conduction which can only be eliminated to a restricted extent by the choice of material and dimensioning.

In the case of the solution found in EP 0 822 605 B1, a plurality of contact tabs which are distributed over the length of the strip are welded onto the edges kept free of active material.

The construction described in EP 0 298 800 B1 has contact tabs fastened transversely over the entire width of the strip and wound up with it.

In EP 0 357 399 B1, the edge of the electrode in strip form is slit into individual tongues which, after winding, are folded together and connected by a metal pin.

Such contact tabs fastened to or on the electrode strip or formed by the electrode strip already prove to be disruptive during winding of the electrode and reduce the production capacity of the winding machines.

The embodiment according to EP 0 413 867 B1 combines a plurality of current collectors each with a contact tab in a segmented or nested fashion which are grouped around an opening in the center of the arrangement of collectors. This construction has the disadvantage that it is heavy and complex to assemble. In the embodiment represented, no more than two contact tabs or stacks of contact tabs can be realized.

It would accordingly be advantageous to provide a galvanic element with a set of wound electrodes in which arrangement connecting elements that are easy to assemble, inexpensive and nevertheless can withstand high current loads ensure reliable contacting of the wound electrodes with the poles of the galvanic element.

SUMMARY OF THE INVENTION

This invention relates to a galvanic element including at least one positive electrode in strip form, at least one negative electrode in strip form, at least one separator in strip form interposed between the positive and negative electrodes such that the separator and the electrodes are spirally rolled, and at least one disk-shaped current collector connected mechanically and electrically conductively to an edge portion of at least one of the electrodes, the current collector having more than one contact tab.

BRIEF DESCRIPTION OF THE DRAWINGS

The structure and mode of operation of a galvanic element according to the invention are explained below on the basis of the figures.

FIG. 1b is a top plan view of the arrangement set forth in FIG. 1a.

FIG. 2b is a top plan view of the electrodes of FIG. 2a.

FIG. 3b is a top plan view of the electrodes of FIG. 3a.

FIG. 4 shows a side elevational view of a set of electrodes preassembled with current collectors and with a cover and seal being pushed by a pushing tool into a housing cup held by a cup holder in accordance with aspects of the invention.

FIG. 5 shows a schematic side elevational view, taken partly in section, of a ready-assembled galvanic element in accordance with aspects of the invention.

DETAILED DESCRIPTION

Figure 1A:
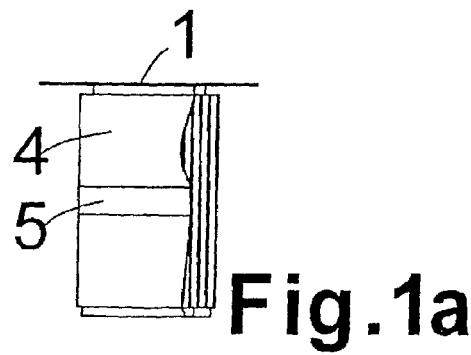
FIG. 1a is a schematic side view of a set of wound electrodes held together by a winding band.

It will be appreciated that the following description is intended to refer to specific embodiments of the invention selected for illustration in the drawings and is not intended to define or limit the invention, other than in the appended claims.

The galvanic element according to the invention offers the least possible resistance to the electrical current through the current collectors with more than one contact tab. These current collectors are much easier to assemble than known collector constructions in galvanic elements for high-current applications. The space-saving flat design of the current collectors results in a high utilization of the capacity of the galvanic element. The invention can accordingly be used with preference in the case of lithium, nickel-metal hydride, nickel-cadmium and other galvanic elements in a substantially cylindrical cell form with wound electrodes.

One special advantage of the invention is that a high-capacity current collector system with a low electrical resistance at the positive and negative electrodes of an electrode coil is realized with the same component. For this purpose, one or more current collectors are conductively connected to the positive and negative edges at the end faces of the wound electrodes.

The contact tabs of the current collector of the one wound electrode are bent inwardly at the edge of the current collector, so that the contact tabs do not touch the housing cup after the galvanic element has been fitted. The end of each contact tab is preferably bent outwardly in a Z-shaped manner and is connected mechanically and electrically conductively to the electrically conducting cover, for example, by welding or pressing.

The contact tabs of the current collector of the other electrode, which is to be inserted into the housing cup, are bent around in such a way that they lie against the lateral surface of the electrode coil. After insertion, the contact tabs lie over a large surface area against the inner lateral surface of the housing cup and, consequently, ensure optimum current transmission from the wound electrode to the housing cup.

Figure 8:
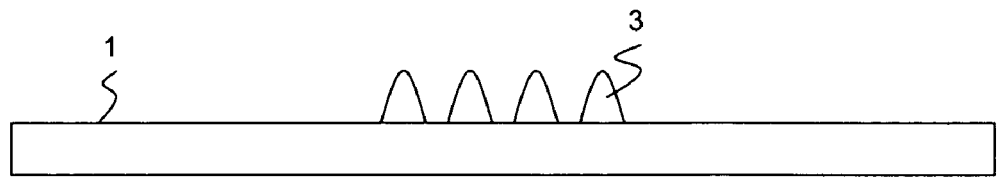
FIGS. 8(a) to 8(d) show schematic views of current collectors having various features provided thereon according to an exemplary embodiment.
Figure 8:
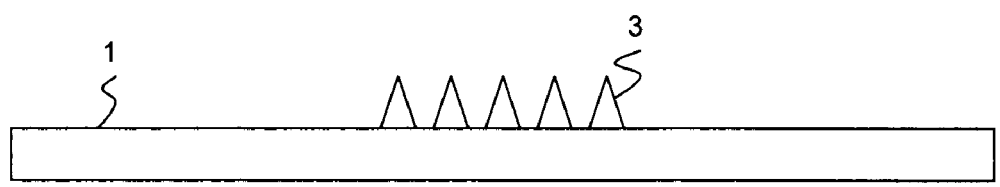
Figure 8:
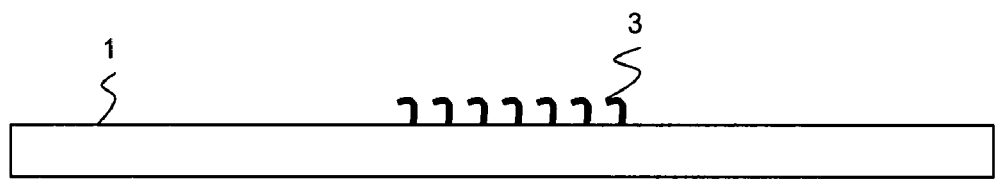
Figure 8:
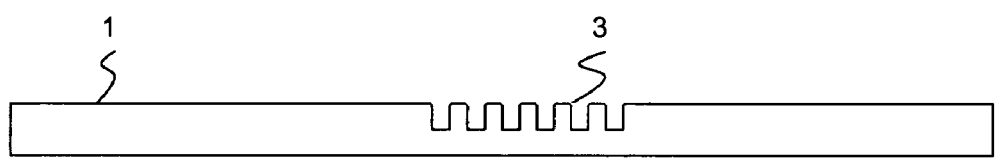

To achieve an optimum connection between the current collector and the edges of the set of wound electrodes, it is advantageous if the current collectors are embossed and, as a result, have pimples (FIG. 8(a)), points (FIG. 8(b)), burrs (FIG. 8(c)) or the like on their surface.

An improvement in the connection between the current collector and the edges of the wound electrodes can also be achieved by the current collector being embossed with radially running beads (FIG. 8(d)). A further possibility of improving this contact is to provide the current collector with apertures.

Figure 1E:
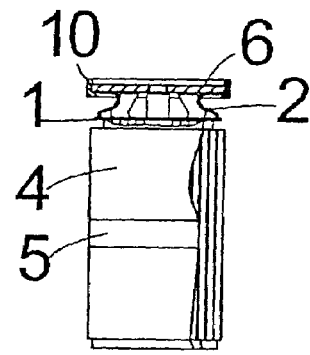
FIG. 1e is a schematic side elevational view of the wound electrodes of FIG. 1c connected to a cell cover.
Figure 1B:
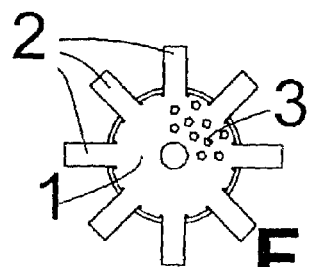
Figure 1C:
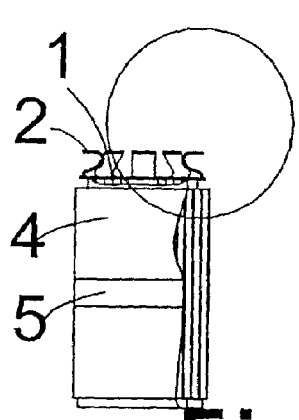
FIG. 1c is a side elevational view of the wound electrodes shown in FIG. 1a, with the contact tabs bent in a Z-shaped manner.
Figure 1F:
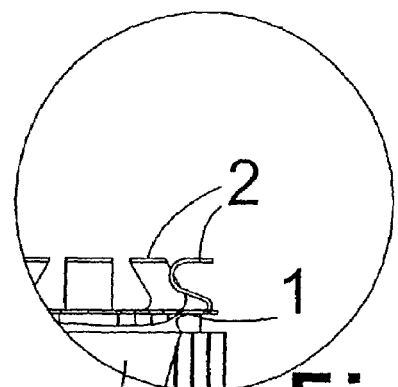
FIG. 1f is an exploded view taken from the phantom line of FIG. 1c.
Figure 1D:
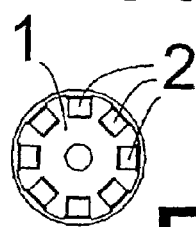
FIG. 1d is a top plan view of the wound electrodes shown in FIG. 1c.
Figure 6:
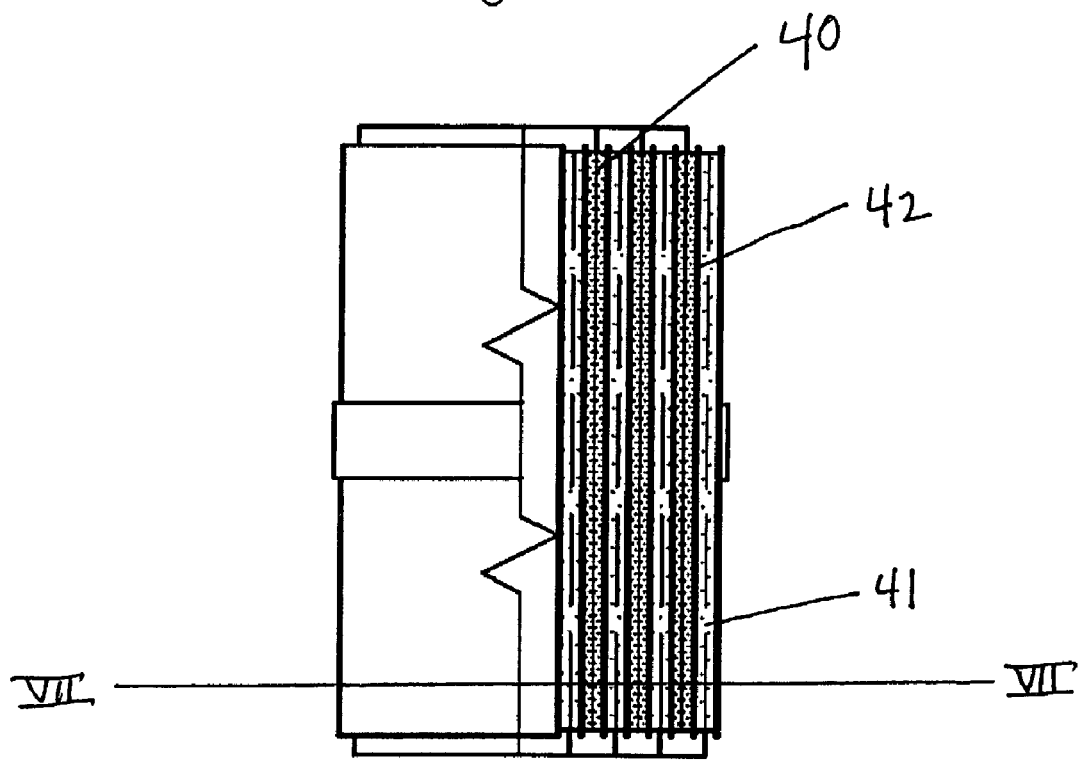
FIG. 6 shows a schematic side view, taken partly in section, of a set of wound electrodes, similar to FIG. 1a, with the electrodes and separator enhanced in detail for ease of understanding.
Figure 7:
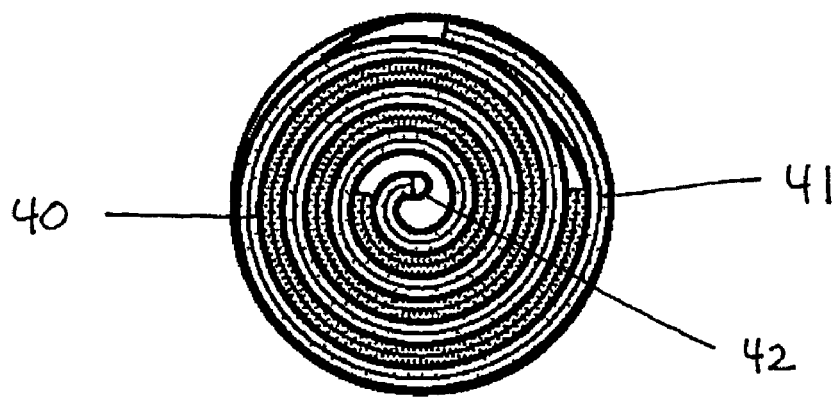
FIG. 7 is a sectional view of the wound electrodes of FIG. 6, taken along the lines VII-VII.

Turning now to the drawings, and referring to FIG. 1a, a collector disk 1 is connected mechanically and electrically conductively, for example, by welding or pressing to the edge portion of an electrode of the set of wound electrodes 4, held together by a winding band 5. FIGS. 6 and 7 show positive electrode 40, negative electrode 41 and separator 42 as they are arranged in a sprial wound or rolled form. FIG. 1b shows a plan view of the arrangement represented in FIG. 1a, in which the embossed structures 3 of the current collector represented by way of example can be seen. In FIG. 1c and the plan view of FIG. 1d, the contact tabs 2 are bent in a Z-shaped manner inwardly and then outwardly, in the way represented in detail in FIG. 1f. In FIG. 1e, the ends of the contact tabs are connected mechanically and electrically conductively, preferably by welding or pressing, to the cell cover 6, which is provided on the peripheral edge with an electrically insulating seal 10.

Figure 2A:
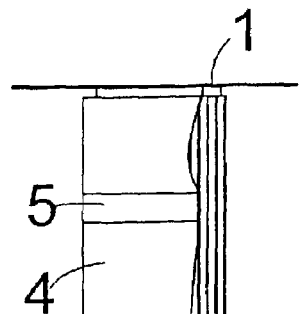
FIG. 2a is a schematic side view of a wound electrode having a collector disk with contact tabs extending radially outwardly.
Figure 2B:
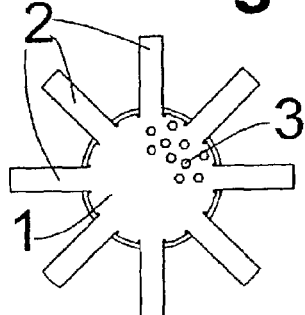
Figure 2C:
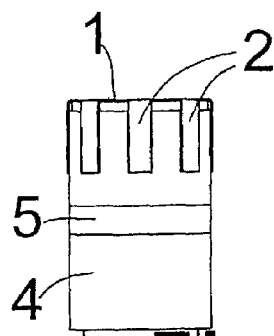
FIG. 2c is a schematic side elevational view of the wound electrodes of FIG. 2a with the contact tabs bent downwardly in the direction of the lateral surface of the wound electrodes.
Figure 2D:
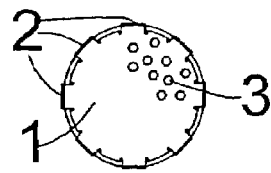
FIG. 2d is a top plan view of the wound electrodes of FIG. 2c.

According to FIG. 2a, a collector disk 1 is connected electrically conductively and mechanically to the edge of the other electrode of the electrode coil 4. FIG. 2b shows a plan view of the arrangement represented in FIG. 2a, in which the embossed structures or apertures 3 of the current collector given by way of example can be seen. In FIG. 2c and the plan view of FIG. 2d, the contact tabs 2 are bent around in the direction of the lateral surface of the set of wound electrodes 4.

Figure 3A:
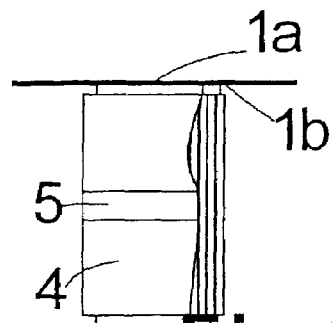
FIG. 3a is a schematic side view of a wound electrode having a collector disk with two contact tabs extending radially outwardly.
Figure 3B:
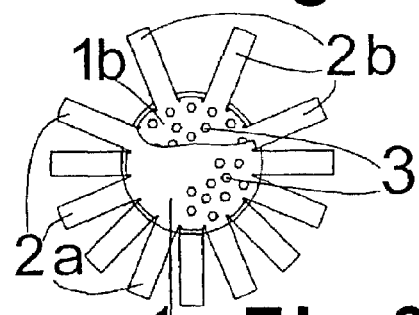
Figure 3C:
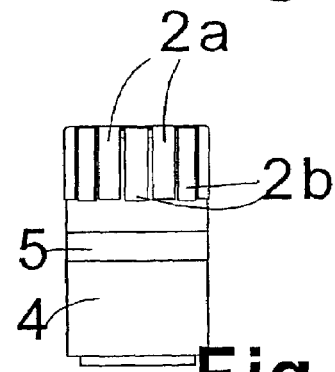
FIG. 3c is a schematic side elevational view of the wound electrodes of FIG. 3a with the contact tabs bent downwardly in the direction of the lateral surface of the wound electrodes.
Figure 3D:
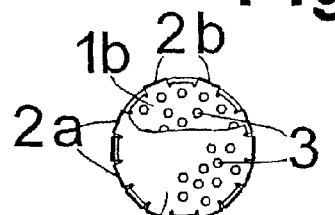
FIG. 3d is a top plan view of the wound electrodes of FIG. 3c.

According to FIG. 3a, as an alternative, two contact disks 1a, 1b, preferably turned with respect to each other about a contact tab division and placed one on top of the other, are connected electrically conductively and mechanically to the edge of the other electrode of the set of electrodes 4, to reduce electrical resistance still further. FIG. 3b shows a plan view of the arrangement represented in FIG. 3a in which the embossed structures 3 of the current collector given by way of example can be seen. In FIG. 3c and the plan view according to FIG. 3d, the contact tabs 2a, 2b are bent around in the direction of the lateral surface of the set of wound electrodes.

According to FIG. 4, the set of electrodes 4 pre-assembled with the current collectors 1, 1a, 1b and with the cover 6 with seal 10 is pushed by a pushing-in tool 8 into the housing cup 7 held by the cup holder 9.

FIG. 5 shows the ready-assembled galvanic element, in which the housing cup is closed by flanging around the edge of the cup, which is provided with a valve plug with an electrically conducting cap 11. The set of wound electrodes 4 with binding band 5 can be seen inside the electrically conducting cup-shaped housing 7. The electrically conducting cover 6 is sealed with respect to the housing by an electrically insulating seal 10. One or more current collectors 1, 1a, 1b with a plurality of contact tabs 2, 2a, 2b arranged on them in a radially distributed manner form the connecting elements which conductively bridge the spatial distance between the poles of the galvanic element, which are formed by the cover 6 and the housing 7, and the edge of the set of wound electrodes 4.

The invention claimed is:

1. A galvanic element comprising:
   at least one positive electrode in strip form;
   at least one negative electrode in strip form;
   at least one separator in strip form interposed between the positive and negative electrodes such that the separator and the electrodes are spirally rolled;
   a housing cup surrounding at least a portion of the electrodes;
   at least one electrically conducting cover being sealed with respect to the housing cup by an electrically insulating seal, one conducting cover and the housing cup forming poles of the galvanic element; and
   at least one current collector comprising a disk-shaped portion and a plurality of contact tabs integrally formed with the disk-shaped portion and extending from the disk-shaped portion, the disk-shaped portion connected mechanically and electrically conductively to an edge portion of at least one of the electrodes, the plurality of contact tabs connected mechanically and electrically conductively to a pole to conductively bridge the distance between the pole of the galvanic element and the edge portion of the electrodes;
   wherein the contact tabs are radially distributed at the outer circumference of the disk-shaped portion of the current collector.

2. The galvanic element according to claim 1, wherein the contact tabs are bent at an acute angle inwardly and outwardly in a Z-shaped manner and are connected to a cell cover.

3. The galvanic element according to claim 1, wherein at least two disk-shaped collectors are fastened one on top of another and to the electrode and are connected electrically conductively and mechanically to a cell cover.

4. The galvanic element according to claim 1, wherein one or more disk-shaped current collectors lie one on top of another and are fastened to the electrodes on a housing cup side and the contact tabs are bent such that the tabs lie against an inner face of the housing cup.

5. The galvanic element according to claim 1, wherein one or more disk-shaped current collectors having contact tabs lie one on top of the other and are positioned with respect to each other such that the tabs of respective collectors are substantially parallel to one another.

6. The galvanic element according to claim 1, wherein the current collector is embossed and has pimples, points or burrs formed on a surface thereof.

7. The galvanic element according to claim 1, wherein the current collector has radially running beads.

8. The galvanic element according to claim 1, wherein the current collector is provided with apertures.

9. A galvanic element comprising:
   at least one positive electrode in strip form;
   at least one negative electrode in strip form;
   at least one separator in strip form interposed between the positive and negative electrodes such that the separator and the electrodes are spirally rolled;
   at least one disk-shaped current collector connected mechanically and electrically conductively to an edge portion of at least one of the electrodes, the current collector having more than one contact tab; and
   a housing cup surrounding at least a portion of the electrodes, wherein one or more disk-shaped current collectors lie one on top of another and are fastened to the electrodes on a housing cup side and the contact tabs are bent such that the tabs lie against an inner face of the housing cup, and wherein, after assembly, the contact tabs of the electrode on the housing cup side lie between an outer lateral surface of the electrodes and an inner lateral surface of the housing cup.

10. The galvanic element according to claim 9, wherein at least two disk-shaped collectors are fastened one on top of another and to the electrode and are connected electrically conductively and mechanically to a cell cover.

11. The galvanic element according to claim 9, wherein one or more disk-shaped current collectors lie one on top of another and are fastened to the electrodes on a housing cup side and the contact tabs are bent such that the tabs lie against an inner face of the housing cup.

12. The galvanic element according to claim 9, wherein one or more disk-shaped current collectors having contact tabs lie one on top of the other and are positioned with respect to each other such that the tabs of respective collectors are substantially parallel to one another.

13. The galvanic element according to claim 9, wherein the current collector is embossed and has pimples, points or burrs formed on a surface thereof.

14. The galvanic element according to claim 9, wherein the current collector has radially running beads.

15. The galvanic element according to claim 9, wherein the current collector is provided with apertures.

* * * * *